(12) United States Patent
Feng et al.

(10) Patent No.: US 11,451,896 B2
(45) Date of Patent: Sep. 20, 2022

(54) EARPHONE CHARGING CASE

(71) Applicant: LUXSHARE PRECISION INDUSTRY CO., LTD., Shenzhen (CN)

(72) Inventors: Yun Feng, Dongguan (CN); ZhenHua Liu, Dongguan (CN); Yong Huang, Dongguan (CN)

(73) Assignee: LUXSHARE PRECISION INDUSTRY CO., LTD., Shenzhen (CN)

( * ) Notice: Subject to any disclaimer, the term of this patent is extended or adjusted under 35 U.S.C. 154(b) by 169 days.

(21) Appl. No.: 16/996,462

(22) Filed: Aug. 18, 2020

(65) Prior Publication Data

US 2021/0281942 A1    Sep. 9, 2021

(30) Foreign Application Priority Data

Mar. 4, 2020    (CN) .......................... 202020252928.X (51) Int. Cl.
*H02J 7/00* (2006.01)
*H04R 1/10* (2006.01)

(52) U.S. Cl.
CPC .......... *H04R 1/1033* (2013.01); *H02J 7/0045* (2013.01)

(58) Field of Classification Search
CPC .............. H04R 1/1033; H04R 2420/07; H04R 2460/17; H04R 1/1016; H04R 1/1025; H02J 7/0045; H02J 7/0013; H02J 7/0044; H02J 2310/22
See application file for complete search history.

(56) References Cited

U.S. PATENT DOCUMENTS

| | | | |
|---|---|---|---|
| D739,657 S | 9/2015 | Hsieh et al. | |
| 9,981,783 B2* | 5/2018 | Valley, III | B65D 43/20 |
| 10,608,450 B2* | 3/2020 | Shayesteh-Pour | H02J 7/0044 |
| 2017/0195466 A1* | 7/2017 | Chen | H04M 1/026 |
| 2017/0195771 A1* | 7/2017 | Hung | G06F 3/165 |
| 2018/0064224 A1* | 3/2018 | Brzezinski | H02J 50/402 |

FOREIGN PATENT DOCUMENTS

| | | |
|---|---|---|
| CN | 304954743 S | 12/2018 |
| CN | 305274871 S | 7/2019 |
| JP | 1648567 S | 12/2019 |

OTHER PUBLICATIONS

Japanese Decision of Registration for Japanese Application No. 2020-017320, dated Jan. 26, 2021, with an English translation.

* cited by examiner

*Primary Examiner* — Nghia M Doan
(74) *Attorney, Agent, or Firm* — Birch, Stewart, Kolasch & Birch, LLP (57) ABSTRACT

The present disclosure provides an earphone charging case including a case body, a case cover, and a sliding mechanism. The case body includes an earphone charging slot. The case cover is disposed on the case body to cover the earphone charging slot. The sliding mechanism is disposed between the case body and the case cover. The sliding mechanism includes a first sliding part and a second sliding part corresponding to the first sliding part. The case cover is slidably connected to the case body through the sliding mechanism. The earphone charging case can be opened and closed through linear sliding movement between the case cover and the case body.

14 Claims, 10 Drawing Sheets

EARPHONE CHARGING CASE

CROSS REFERENCE TO RELATED APPLICATION

This application claims the priority benefit of Chinese Patent Application Serial Number CN202020252928.X, filed on Mar. 4, 2020, the full disclosure of which is incorporated herein by reference.

BACKGROUND

Technical Field

The present disclosure relates to the technical field of earphone charging case, particularly to an earphone charging case of which a case cover and a case body is opened or closed by sliding.

Related Art

The conventional case of Bluetooth wireless earphones are provided with a detachable cover tend to be missing under a normal using situation.

SUMMARY

The embodiments of the present disclosure provide an earphone charging case to solve the problem of the missing of the case cover.

The present disclosure provides an earphone charging case comprising a case body, a case cover, and a sliding mechanism. The case body comprises an earphone charging slot. The case cover is disposed on the case body to cover the earphone charging slot. The sliding mechanism is disposed between the case body and the case cover. The sliding mechanism comprises a first sliding part and a second sliding part corresponding to the first sliding part. The case cover is slidably connected to the case body through the sliding mechanism.

In the embodiments of the present disclosure, the case cover is opened and closed slidably relative to the case body through the sliding mechanism. The case cover is slidably connected to the case body through the sliding mechanism. Thus, when handling and using a charging case, the case cover would not be detached from the case body to avoid the issue that the case cover is easily missing.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an" does not exclude other same elements existing in the process, the method, the article, or the device which includes the element.

In the following embodiment, the same reference numerals are used to refer to the same or similar elements throughout the disclosure.

Figure 1:
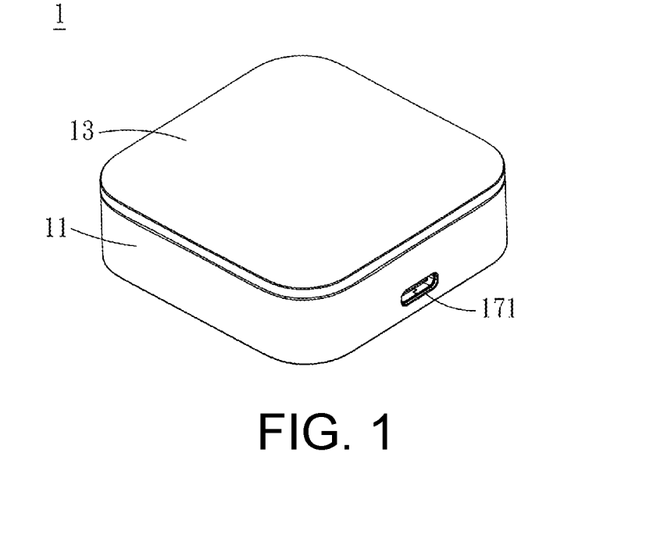
FIG. 1 is a perspective view of an earphone charging case of the first embodiment of the present disclosure.
Figure 2:
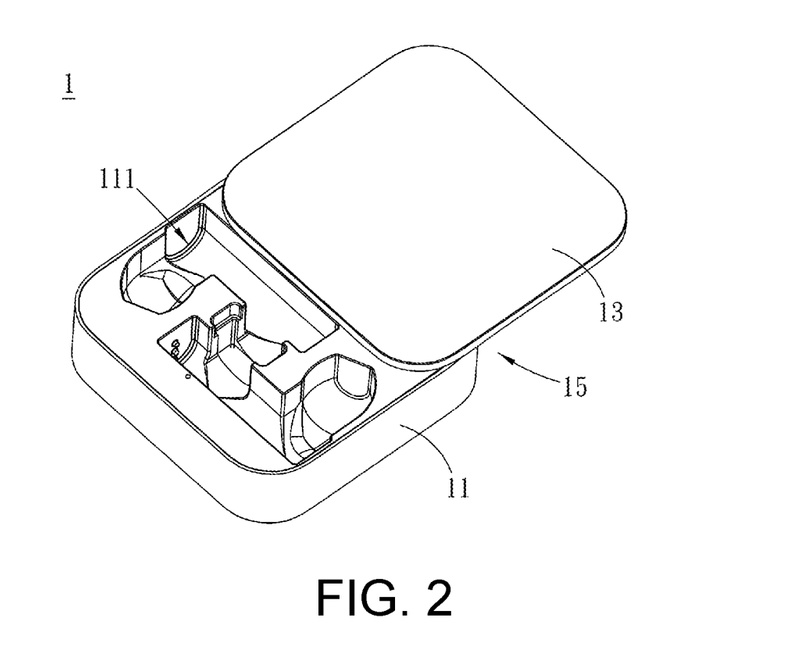
FIG. 2 is another perspective view of the earphone charging case of the first embodiment of the present disclosure.

FIG. 1 and FIG. 2 are perspective views of an earphone charging case of the first embodiment of the present disclosure. As shown in the figure, the present application provides an earphone charging case 1 for accommodating and charging a Bluetooth earphone. In this embodiment, the earphone charging case 1 comprises a case body 11, a case cover 13 and a sliding mechanism 15.

Figure 3:
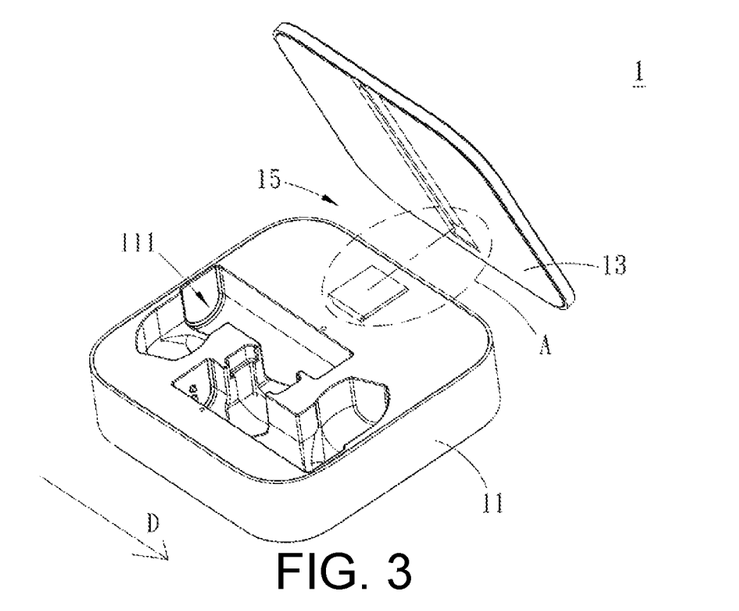
FIG. 3 is an exploded view of the earphone charging case of the first embodiment of the present disclosure.
Figure 4:
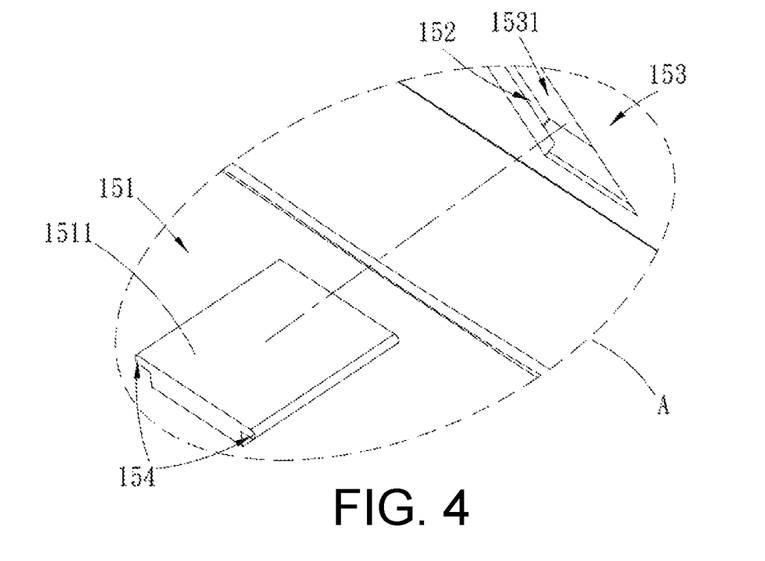
FIG. 4 is an enlarged view of area A of FIG. 3.

FIG. 3 is an exploded view of the earphone charging case of the first embodiment of the present disclosure. FIG. 4 is an enlarged view of area A of FIG. 3. As shown in the figure, in this embodiment, the case body 11 comprises an earphone charging slot 111. The case cover 13 is disposed on the case body 11 to cover the earphone charging slot 111. The sliding mechanism 15 is provided between the case body 11 and the case cover 13. The sliding mechanism 15 comprises a first sliding part 151 and a second sliding part 153 corresponding to the first sliding part 151. The case cover 13 is slidably connected to the case body 11 by the sliding mechanism 15. The first sliding part 151 is a sliding block 1511, the second sliding part 153 is a chute 1531, and the sliding block 1511 is slidably connected to the chute 1531.

In this embodiment, the sliding block 1511 is disposed on the surface of the case body 11 facing the case cover 13. The chute 1531 is provided on the surface of the case cover 13 facing the case body 11. The extending direction of the chute 1531 is perpendicular to the length direction D of the earphone charging slot 111. In other words, the first sliding part 151 is disposed on the case body 11 and the second sliding part 153 is disposed on the case cover 13. The two opposite sidewalls of the chute 1531 are respectively provided with a slideway 152. The two opposite sides of the sliding block 1511 are respectively provided with a bump 154. The surface of the sliding block 1511 contacting the bottom of the chute 1531 extends toward the sidewalls on two sides of the chute 1531 to form the bumps 154. The bumps 154 would be further embedded in the slideways 152 on two sides of the bottom of the chute 1531. The bump 154 and the slideway 152 can slide relatively in the extending direction of the slideway 152. In this way, the case body 11 and the case cover 13 would be secured to each other by the bump 154 and the slideway 152 and can restrict the sliding block 1511 to move linearly in the chute 1531.

While the earphone charging case 1 of this embodiment is not in use, the case cover 13 covers the earphone charging slot 111 of the case body 11, so the case cover 13 is closed. The case cover 13 can be pushed in a direction perpendicular to the length direction D of the earphone charging slot 111 to move the sliding block 1511 from one end of the chute 1531 to the other end of the chute 1531, the case cover 13 would slide relative to and parallel to the case body 11 until the earphone charging slot 111 is completely exposed. At this state, the case cover 13 is opened, and the Bluetooth earphone could be taken out from the earphone charging slot 111.

In another embodiment, the chute 1531 can also be disposed on a surface of the case body 11 facing the case cover 13, and the sliding block 1511 can be disposed on the surface of the case cover 13 facing the case body 11. In other words, the second sliding part 153 is disposed on the case body 11 and the first sliding part 151 is disposed d on the case cover 13.

Figure 5:
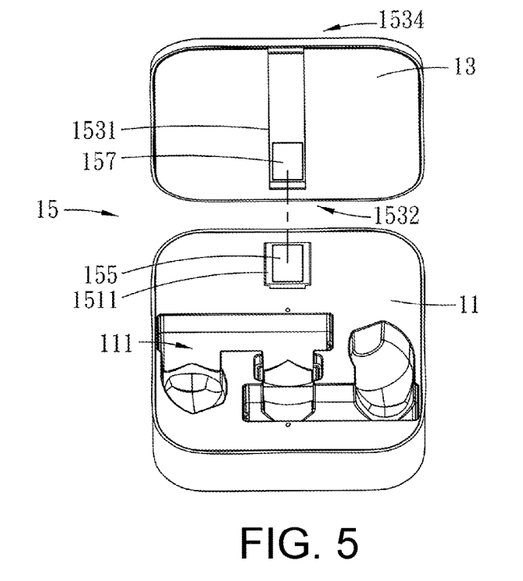
FIG. 5 is a schematic view of an earphone charging case of the second embodiment of the present disclosure.

FIG. 5 is a schematic view of an earphone charging case of the second embodiment of the present disclosure. As shown in the figure, the difference between the earphone charging case of this embodiment and that of the first embodiment is that the sliding mechanism 15 further comprises a first positioning part 155 and a second positioning part 157. The first positioning part 155 is disposed on the sliding block 1511, and the second positioning part 157 is disposed in the chute 1531. The first positioning part 155 corresponds to the second positioning part 157. The first positioning part 155 is a magnet, and the second positioning part 157 is a magnetic body. The first positioning part 155 and the second positioning part 157 attract each other to position the relative position between the case cover 13 and the case body 11.

In this embodiment, the first positioning part 155 is disposed on the sliding block 1511, and the chute 1531 has a first end 1532 and a second end 1534 provided in an extending direction of the chute 1531. That is, with the chute 1531 facing the case body 11, the first end 1532 of the chute 1531 is away from the earphone charging slot 111. On the other hand, the second end 1534 of the chute 1531 is close to the earphone charging slot 111. The second positioning part 157 is disposed at the first end 1532 of the chute 1531. When the case cover 13 covers the earphone charging slot 111 of the case body 11, the first positioning part 155 of the case body 11 is opposite to the second positioning part 157 of the case cover 13. The first positioning part 155 attracts and secures the second positioning part 157 to keep the case cover 13 closed. When the case cover 13 slides away from the case body 11, the second positioning part 157 is disengaged from the first positioning part 155, exposing the earphone charging slot 111 of the case body 11. At this state, the case cover 13 is opened.

In another embodiment, the first positioning part 155 can also be disposed on the sliding block 1511, and the second positioning part 157 can also be disposed at one end of the chute 1531 close to the earphone charging slot 111. When the case cover 13 slides away from the case body 11, the second positioning part 157 moves to cover the first positioning part 155, and the first positioning part 155 attracts and secures the second positioning part 157 to keep the case cover 13 opened.

Figure 6:
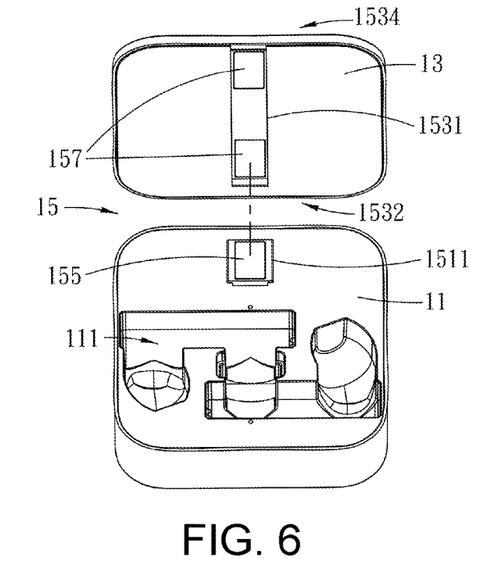
FIG. 6 is a schematic view of an earphone charging case of the third embodiment of the present disclosure.

FIG. 6 is a schematic view of an earphone charging case of the third embodiment of the present disclosure. As shown in the figure, the difference between the earphone charging case of this embodiment and that of the second embodiment is that the number of second positioning parts 157 is two. The two second positioning parts 157 are respectively disposed at two ends of the chute 1531 in the extending direction (i.e., the first end 1532 and the second end 1534). In this embodiment, the case cover 13 covers the earphone charging slot 111 of the case 11, and the first positioning part 155 attracts and secures the second positioning part 157 disposed at the first end 1532 of the chute 1531 to keep the case cover 13 closed. When the case cover 13 slides away from the case body 11, the second positioning part 157 away from the earphone charging slot 111 is detached from the first positioning part 155, exposing the earphone charging slot 111 from the case body 11. The second positioning part 157 disposed at the second end 1534 of the chute 1531 covers the first positioning part 155. The first positioning part 155 attracts and secures the second positioning part 157 close to the earphone charging slot 111 to keep the case cover 13 opened. Whether the case cover 13 of this embodiment is in a closed or open state, the first positioning part 155 can be secured by attracting one of the two second positioning parts 157 to secure the relative position between the case body 11 and the case cover 13 to facilitate the use of the earphone charging case.

Figure 7:
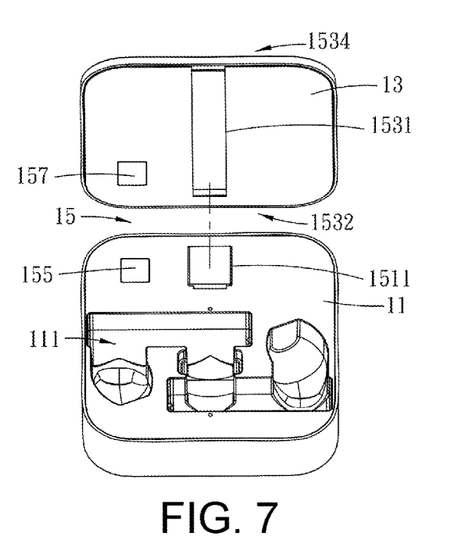
FIG. 7 is a schematic view of an earphone charging case of the fourth embodiment of the present disclosure.

FIG. 7 is a schematic view of an earphone charging case of the fourth embodiment of the present disclosure. As shown in the figure, the difference between the earphone charging case of this embodiment and that of the second embodiment is the location of the first positioning part 155 and the second positioning part 157. In this embodiment, the first positioning part 155 is disposed on one side of the sliding block 1511, and the second positioning part 157 is disposed on one side of the chute 1531. The first positioning part 155 corresponds to the second positioning part 157. In this embodiment, the first positioning part 155 also attracts the second positioning part 157 close to the first end 1532 of the chute 1531 to keep the case cover 13 closed, thus it would not be repeated again herein.

Figure 8:
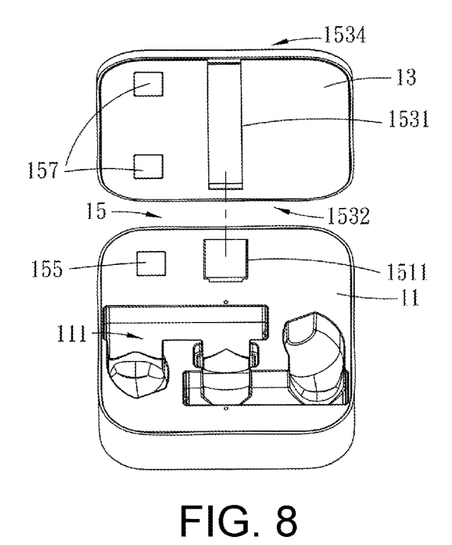
FIG. 8 is a schematic view of an earphone charging case of the fifth embodiment of the present disclosure.

FIG. 8 is a schematic view of an earphone charging case of the fifth embodiment of the present disclosure. As shown in the figure, the difference between the earphone charging case of this embodiment and that of the third embodiment is the location of the first positioning part 155 and the second positioning part 157. In this embodiment, the number of the second positioning parts 157 is two. The two second positioning parts 157 are respectively disposed at two ends of the chute 1531 of the case cover 13 in an extending direction. In this embodiment, the first positioning part 155 is also attracted to the second positioning part 157 close to the first end 1532 of the chute 1531, so that the case cover 13 is kept closed. On the other hand, the first positioning part 155 is attracted to the second positioning part 157 close to the second end 1534 of the chute 1531, so that the case cover 13 is kept open, which would not be repeated again herein.

Figure 9:
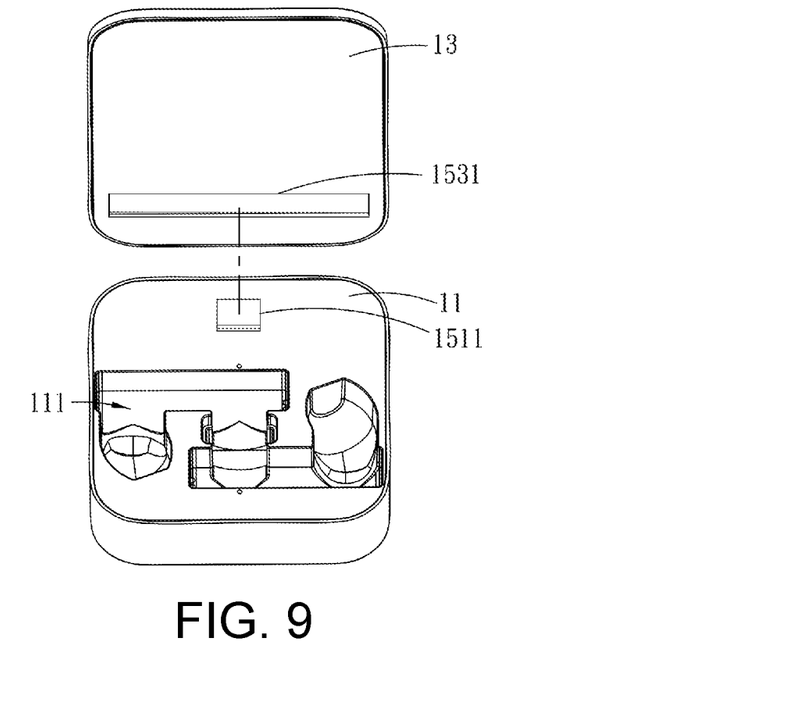
FIG. 9 is a schematic view of an earphone charging case of the sixth embodiment of the present disclosure.

FIG. 9 is a schematic view of an earphone charging case of the sixth embodiment of the present disclosure. As shown in the figure, the difference between the earphone charging case of this embodiment and that of the first embodiment is that the extending direction of the chute 1531 is parallel to the length direction of the earphone charging slot 111. In this embodiment, the case cover 13 slides relative to the case body 11 through the sliding mechanism 15, the sliding block 1511 slides to any of two ends of the chute 1531, and the case cover 13 slides along the extending direction of the chute 1531 so that the case cover 13 is opened. Furthermore, the sliding block 1511 slides to the middle of the chute 1531 to close the case cover 13, which would not be repeated again herein.

Figure 10:
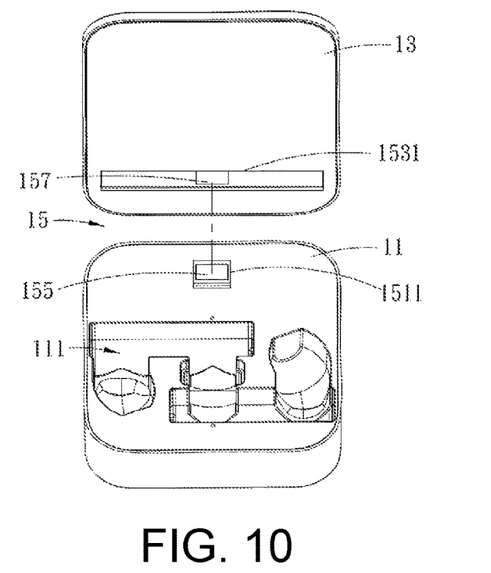
FIG. 10 is a schematic view of an earphone charging case of the seventh embodiment of the present disclosure.

FIG. 10 is a schematic view of an earphone charging case of the seventh embodiment of the present disclosure. As shown in the figure, the earphone charging case of this embodiment is different from that of the sixth embodiment in that it further comprises a first positioning part 155 and a second positioning part 157. The first positioning part 155 is disposed on the sliding block 1511, and the second positioning part 157 is disposed in the chute 1531. The first positioning part 155 corresponds to the second positioning part 157. The first positioning part 155 is a magnet, and the second positioning part 157 is a magnetic body. The first positioning part 155 and the second positioning part 157 attract each other to position the case cover 13 and the case body 11 for being close or open. In this embodiment, the first positioning part 155 is disposed on the sliding block 1511, and the second positioning part 157 is disposed in the middle of the chute 1531. When the case cover 13 covers the earphone charging slot 111 of the case body 11, the first positioning part 155 of the case body 11 is opposite to the second positioning part 157. That is, the second positioning part 157 covers the first positioning part 155, and the first positioning part 155 attracts and secures the second positioning part 157, keeping the case cover 13 closed. When the case cover 13 slides to the left or right side with respect to the case body 11, the second positioning part 157 is detached from the first positioning part 155, exposing the earphone charging slot 111 from the case body 11 to keep the case cover 13 opened.

In another embodiment, the first positioning part 155 can also be disposed on the sliding block 1511. The number of the second positioning parts 157 is two, and the two second positioning parts 157 are respectively disposed at two ends of the sliding path of the case cover 13 on a moving path along which the case cover 11 slides relative to the case body 11 through the sliding mechanism 15. When the case cover 13 slides to the left or right relative to the case body 11, one of the two second positioning parts 157 is moved to cover the first positioning part 155, which attracts and secures one of the two second positioning parts 157 to keep the case cover 13 opened.

Figure 11:
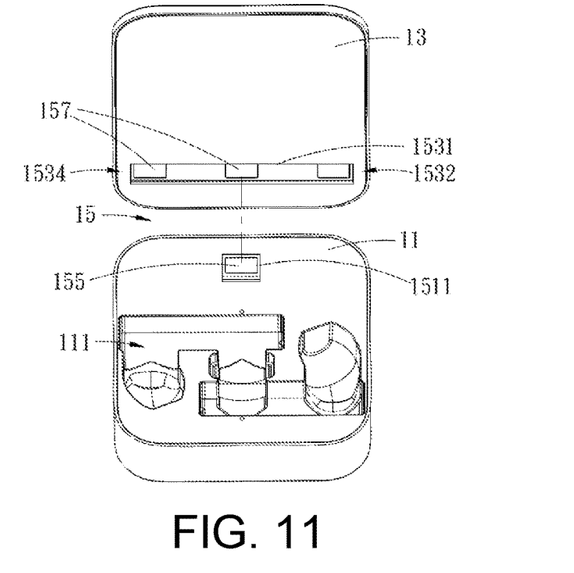
FIG. 11 is a schematic view of an earphone charging case of the eighth embodiment of the present disclosure.

FIG. 11 is a schematic view of an earphone charging case of the eighth embodiment of the present disclosure. As shown in the figure, the difference between the earphone charging case of this embodiment and that of the seventh embodiment is that the number of the second positioning part 157 is plural. The second positioning parts 157 are disposed in the chute 1531 at intervals, specifically disposed in the middle of the moving path of the chute 1531 and disposed at the first end 1532 and the second end 1534 of the chute 1531 in the extending direction. When the first positioning part 155 attracts the second positioning part 157 disposed in the middle of the sliding path of the chute 1531, the case cover 13 remains closed. When the first positioning part 155 attracts the second positioning part 157 of the first end 1532 or the second positioning part 157 of the second end 1534 in the extending direction of the chute 1531, the case cover 13 remains opened.

Figure 12:
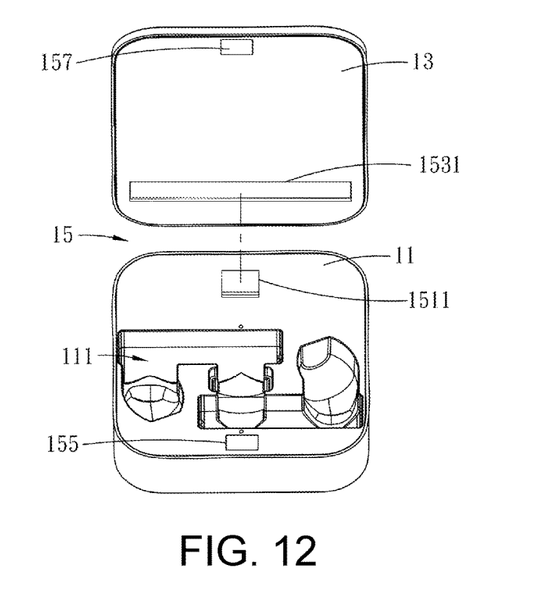
FIG. 12 is a schematic view of an earphone charging case of the ninth embodiment of the present disclosure.

FIG. 12 is a schematic view of an earphone charging case of the ninth embodiment of the present disclosure. As shown in the figure, the difference between the earphone charging case of this embodiment and that of the seventh embodiment is that the location of the first positioning part 155 and the second positioning part 157. In this embodiment, the first positioning part 155 is disposed on one side of the sliding block 1511. The second positioning part 157 is disposed on one side of the case cover 13 away from the chute 1531 and is aligned with the middle point of the chute 1531 in the extending direction. The first positioning part 155 corresponds to the second positioning part 157. In this embodiment, the case cover 13 is kept closed by the first positioning part 155 attracting the second positioning part 157.

Figure 13:
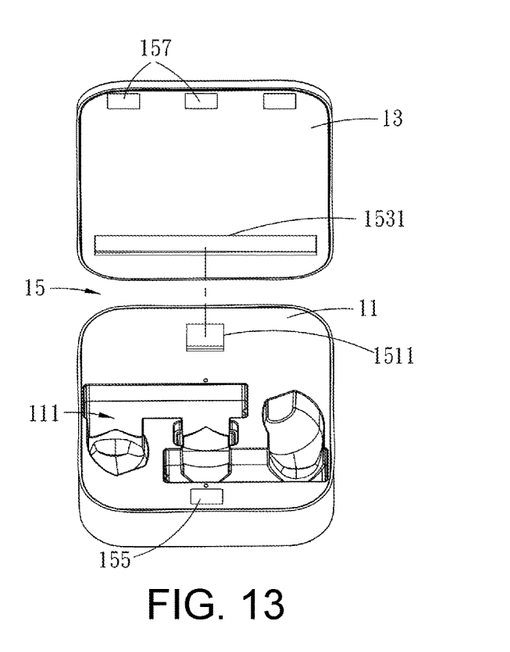
FIG. 13 is a schematic view of an earphone charging case of the tenth embodiment of the present disclosure.

FIG. 13 is a schematic view of an earphone charging case of the tenth embodiment of the present disclosure. As shown in the figure, the difference between the earphone charging case of this embodiment and that of the eighth embodiment is the location of the first positioning part 155 and the second positioning part 157. In this embodiment, the number of the second positioning part 157 is three. The three second positioning parts 157 are disposed on one side of the case cover 13 away from the chute 1531, one of the second positioning parts 157 is aligned with the middle point of the chute 1531 in the extending direction, and the other two second positioning parts 157 are respectively aligned with the two ends of the chute 1531 in the extending direction. In this embodiment, the first positioning part 155 also attracts the second positioning part 157 close to the middle of the chute 1531 to keep the case cover 13 closed. When the first positioning part 155 is attracted to the second positioning parts 157 close to the two ends of the chute 1531 in the extending direction, the case cover 13 remains opened.

Figure 14:
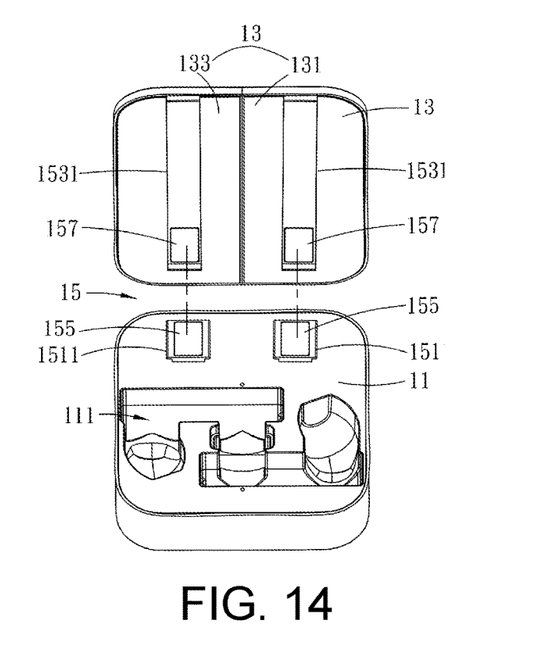
FIG. 14 is a schematic view of an earphone charging case of the eleventh embodiment of the present disclosure.

FIG. 14 is a schematic view of an earphone charging case of the eleventh embodiment of the present disclosure. As shown in the figure, the earphone charger of this embodiment differs from that of the second embodiment in that the number of sliding mechanisms 15 is plural. In this embodiment, the number of sliding mechanisms 15 is two. The chutes 1531 of the sliding mechanism 15 are disposed parallel to each other, and the extending direction of the two chutes 1531 is perpendicular to the length direction of the earphone charging slot 111. The two sliding blocks 1511 correspond to the two chutes 1531 respectively.

In addition, in this embodiment, the case cover 13 comprises a first case cover part 131 and a second case cover part 133 according to the positions of the two sliding mechanisms 15. The first case cover part 131 and the second case cover part 133 can be opened individually by the sliding mechanism 15 to make it more convenient to use with variability.

Figure 15:
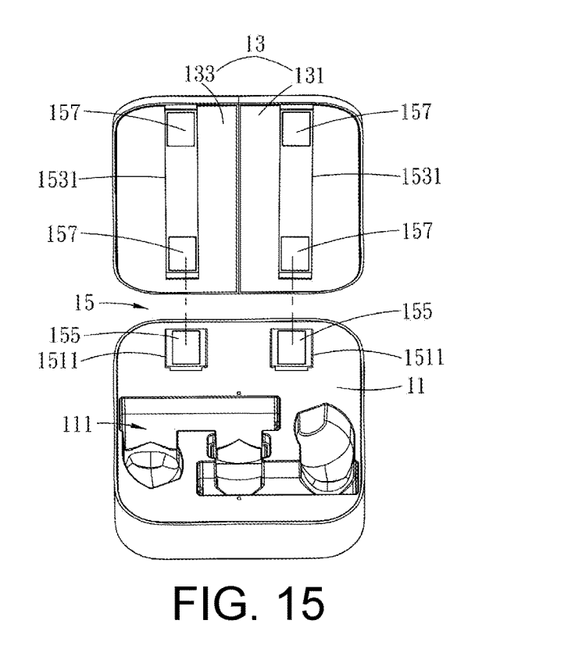
FIG. 15 is a schematic view of an earphone charging case of the twelfth embodiment of the present disclosure.

FIG. 15 is a schematic view of an earphone charging case of the twelfth embodiment of the present disclosure. As shown in the figure, the difference between the earphone charging case of this embodiment and that of the eleventh embodiment is that the number of second positioning parts 157 is plural. In this embodiment, each sliding mechanism 15 is provided with two of the second positioning parts 157 respectively at two ends of the chute 1531 in the extending direction. In this embodiment, whether the first case cover part 131 and the second case cover part 133 are closed or opened, they can be secured by the first positioning part 155 attracting one of the second positioning parts 157, facilitating the use of the earphone charging case.

Figure 16:
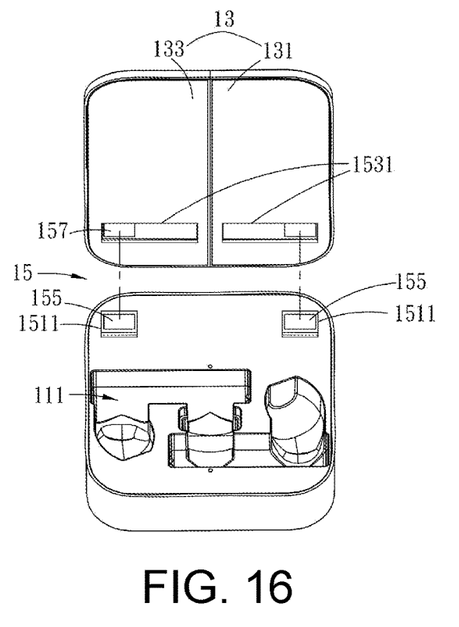
FIG. 16 is a schematic view of an earphone charging case of the thirteenth embodiment of the present disclosure.

FIG. 16 is a schematic view of an earphone charging case of the thirteenth embodiment of the present disclosure. As shown in the figure, the difference between the earphone charging case of this embodiment and that of the eleventh embodiment is that the extending direction of the plurality of chutes 1531 is parallel to the length direction of the earphone charging slot 111. In this embodiment, the two sliding slots 1531 are disposed in the same extending direction, and the two sliding blocks 1511 are respectively disposed corresponding to the two sliding slots 1531 individually. When the first case cover part 131 and the second case cover part 133 are closed, the second positioning part 157 of the first case cover 131 covers the first positioning part 155 of one of the sliding blocks 1511, so the first positioning part 155 would attract and secure the second positioning part 157. Similarly, the second positioning part 157 of the second case cover part 133 covers the first positioning part 155 of the other sliding block 1511 so that the first positioning part 155 would attract and secure the second positioning part 157.

In this embodiment, the first case cover 131 and the second case cover 133 can individually slide away from the case body 11 towards the two sides of the case body 11. Thus, both the second positioning part 157 of the first case cover part 131 and the second positioning part 157 of the second case cover part 133 can be detached from the first positioning part 155 of the case body 11, and the first case cover part 131 and the second case cover part 133 are opened.

Figure 17:
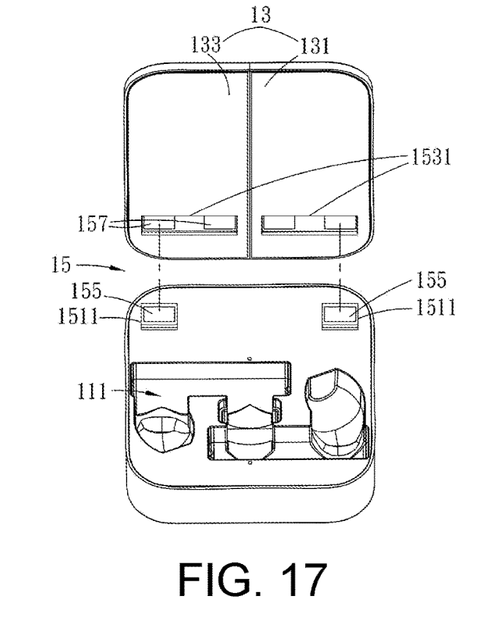
FIG. 17 is a schematic view of an earphone charging case of the fourteenth embodiment of the present disclosure.

FIG. 17 is a schematic view of an earphone charging case of the fourteenth embodiment of the present disclosure. As shown in the figure, the earphone charging case of this embodiment is different from that of the thirteenth embodiment in that it comprises a plurality of second positioning parts 157. In this embodiment, the chute 1531 of the first case cover 131 and the chute 1531 of the second case cover 133 are individually provided with two second positioning parts 157. The two second positioning parts 157 are provided at two ends of the chute 1531 in the extending direction. In this embodiment, whether the first case cover part 131 and the second case cover part 133 are closed or opened, they can be secured by the first positioning part 155 attracting one of the second positioning parts 157, facilitating the use of the earphone charging case.

Figure 18:
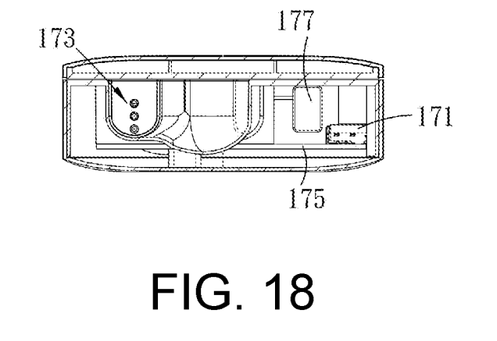
FIG. 18 is a cross-sectional view of the earphone charging case of the present disclosure.
Figure 19:
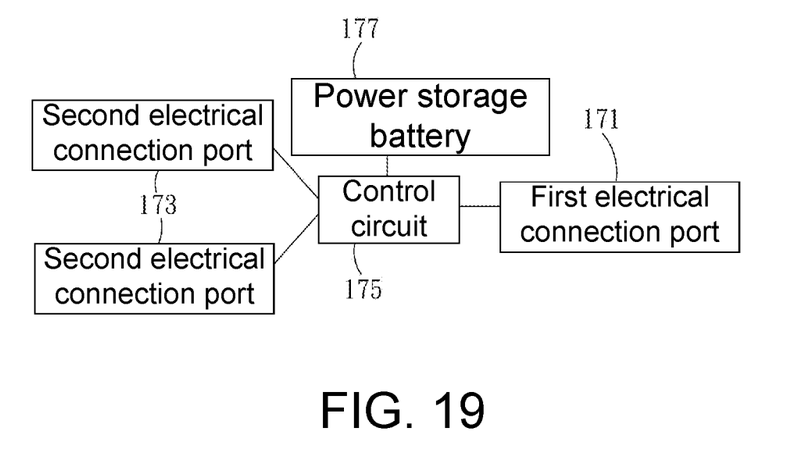
FIG. 19 is a circuit diagram of the earphone charging case of the present disclosure.

FIG. 18 and FIG. 19 are cross-sectional view and circuit diagram of the earphone charging case of the present disclosure. As shown in the figures, in this embodiment, the earphone charging case 1 further comprises a first electrical connection port 171, a plurality of second electrical connection ports 173, a control circuit 175, and a power storage battery 177. The first electrical connection port 171 is disposed on one side surface of the case body 11. The plurality of second electrical ports 173 is disposed on an inner wall of the earphone charging slot 111. The power storage battery 177 and the control circuit 175 are disposed in the case body 11. The first electrical connection port 171, the plurality of second electrical connection ports 173, and the power storage battery 177 are electrically connected to the control circuit 175, respectively.

Therefore, after the first electrical connection port 171 is connected to an external power source, the electrical energy is transferred to the power storage battery 177 for storage. The first electrical connection port 171 may be a conventional electrical jack such as USB, Micro USB, Type-C, etc. The second electrical connection port 173 corresponds to the charging port on the Bluetooth earphone, delivering electrical energy to the Bluetooth earphone. The control circuit 175 is used to transfer the electric energy from the first electrical connection port 171 to the power storage battery 177 and controls the second electrical connection port to output electrical energy from the storage power storage battery 177, etc.

In summary, the present disclosure proposed an earphone charging case, in which the case cover can be opened and closed by a sliding mechanism. Through the linear relative motion between the case cover and the case body, the influence of the friction loss between the case cover and the case body can be very limited to extend the service life of the earphone charging case.

It is to be understood that the term "comprises", "comprising", or any other variants thereof, is intended to encompass anon-exclusive inclusion, such that a process, method, article, or device of a series of elements not only include those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. An earphone charging case, comprising:
   a case body comprising an earphone charging slot;
   a case cover disposed on the case body to cover the earphone charging slot; and
   a sliding mechanism disposed between the case body and the case cover; the sliding mechanism comprising a first sliding part and a second sliding part corresponding to the first sliding part; and the case cover being slidably connected to the case body through the sliding mechanisms;
   wherein the first sliding part is a sliding block; the second sliding part is a chute; the sliding block is slidably connected to the chute;
   wherein the sliding mechanism further comprises a first positioning part and a second positioning part; the first positioning part is disposed on the sliding block; the second positioning part is disposed in the chute; and the first positioning part corresponds to the second positioning part.

2. The earphone charging case according to claim 1, wherein the sliding block is disposed on a surface of the case body facing the case cover; and the chute is disposed on a surface of the case cover facing the case body.

3. The earphone charging case according to claim 2, wherein an extending direction of the chute is parallel or perpendicular to a length direction of the earphone charging slot.

4. The earphone charging case according to claim 1, wherein the chute is disposed on a surface of the case body facing the case cover; and the sliding block is disposed on a surface of the case cover facing the case body.

5. The earphone charging case according to claim 4, wherein an extending direction of the chute is parallel or perpendicular to a length direction of the earphone charging slot.

6. The earphone charging case according to claim 1, wherein two sidewalls of the chute are respectively provided with a slideway; and two sides of the sliding block are respectively provided with a bump disposed in the corresponding slideway.

7. The earphone charging case according to claim 1, wherein the number of the second positioning part is two; and the two second positioning parts are respectively disposed at two ends in an extending direction of the chute.

8. The earphone charging case according to claim 1, wherein the number of the second positioning part is plural; and the second positioning parts are disposed in the chute at intervals.

9. The earphone charging case according to claim 1, wherein the first positioning part is a magnet; and the second positioning part is a magnetic body.

10. The earphone charging case according to claim 1, further comprising a first electrical connection port, a plurality of second electrical connection ports, a control circuit, and a power storage battery, wherein the first electrical connection port is disposed on one side surface of the case body; the plurality of second electrical connection ports is disposed on an inner wall of the earphone charging slot; the power storage battery and the control circuit are disposed in the case body; the first electrical connection port, the plurality of second electrical connection ports, and the power storage battery are electrically connected to the control circuit, respectively.

11. An earphone charging case, comprising:
    a case body comprising an earphone charging slot;
    a case cover disposed on the case body to cover the earphone charging slot; and
    a sliding mechanism disposed between the case body and the case cover; the sliding mechanism comprising a first sliding part and a second sliding part corresponding to the first sliding part; and the case cover being slidably connected to the case body through the sliding mechanism;
    wherein the first sliding part is a sliding block; the second sliding part is a chute; the sliding block is slidably connected to the chute;
    wherein the sliding mechanism comprising a first positioning part and a second positioning part; the first positioning part is disposed on one side of the sliding block; the second positioning part is disposed on one side of the chute; and the first positioning part corresponds to the second positioning part.

12. The earphone charging case according to claim 11, wherein the number of the second positioning part is two; and the two second positioning parts are respectively disposed at two ends of the case cover on a moving path along which the case cover slides relative to the case body through the sliding mechanism.

13. The earphone charging case according to claim 11, wherein the number of the second positioning part is plural; and the second positioning parts are disposed on one side of the chute at intervals.

14. The earphone charging case according to claim 11, wherein the first positioning part is a magnet; and the second positioning part is a magnetic body.

* * * * *